R. G. KENNEDY.
THE ROYAL TRUST COMPANY EXECUTOR AND TRUSTEE OF THE WILL OF SAID R. G. KENNEDY, DEC'D.
DEVICE FOR CONTROLLING A SUPPLY OF WATER FOR IRRIGATION OR OTHER PURPOSES.
APPLICATION FILED SEPT. 19, 1918.
1,388,723.
Patented Aug. 23, 1921.
3 SHEETS—SHEET 3.
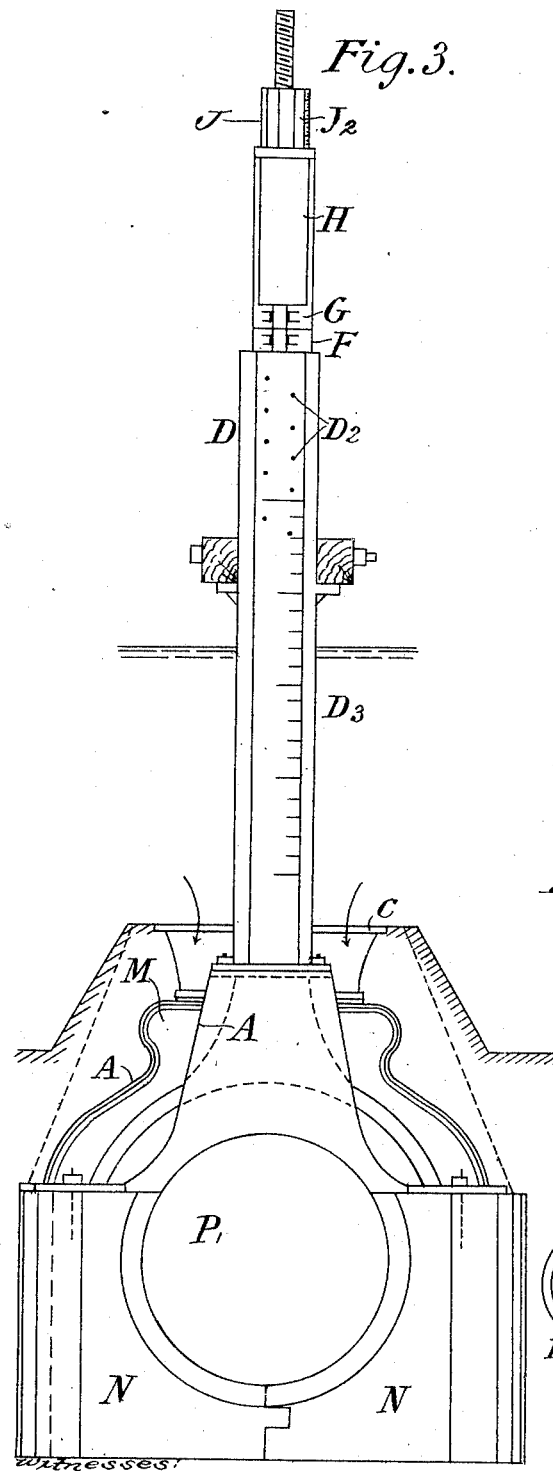
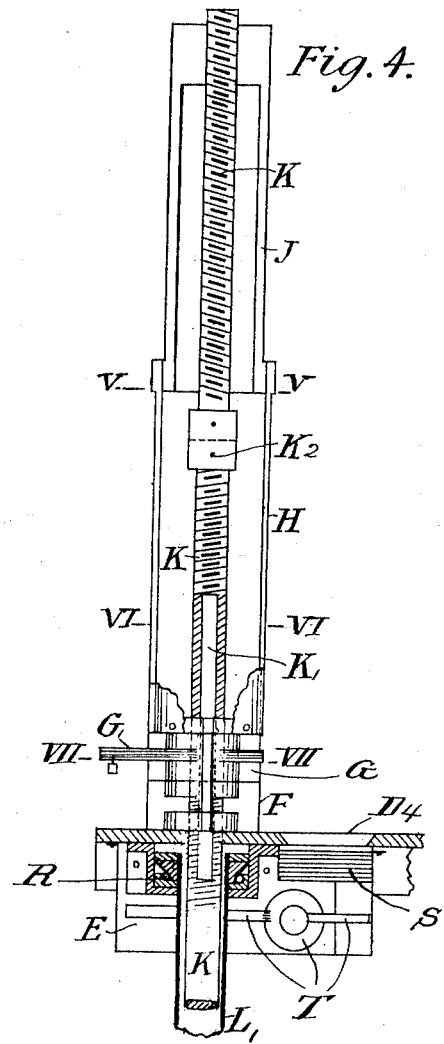
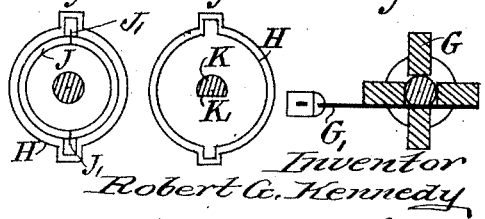

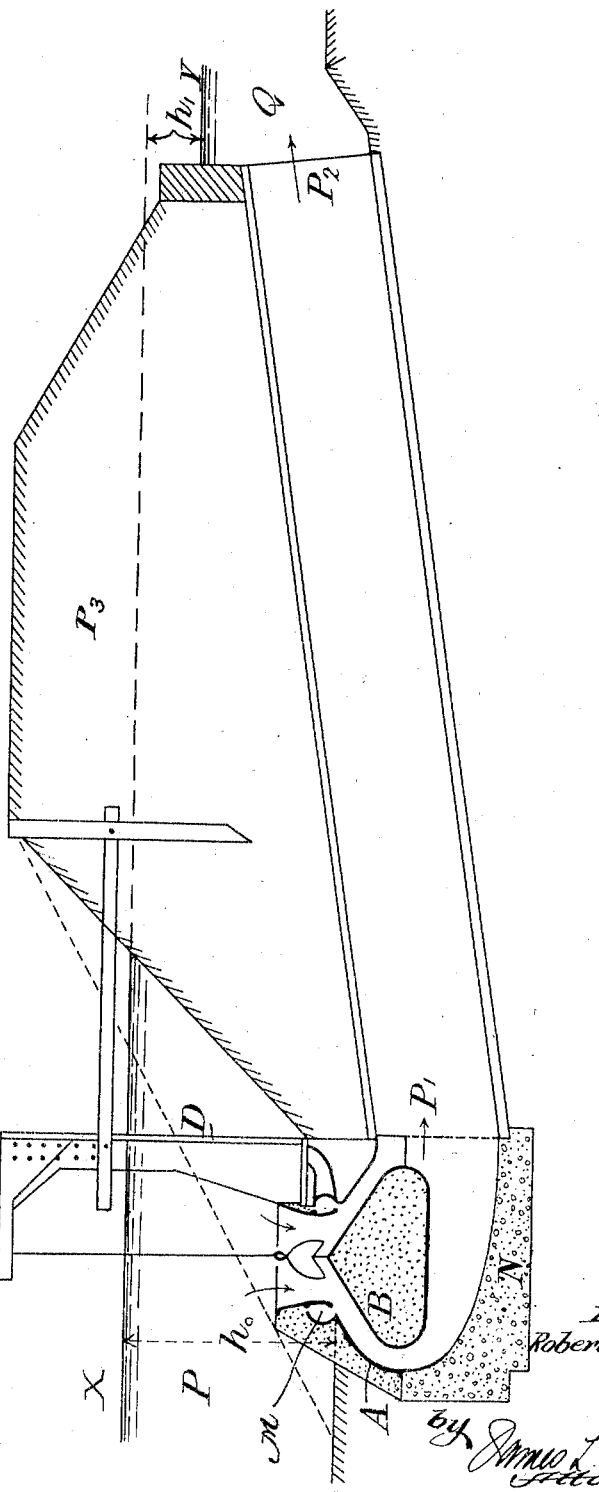

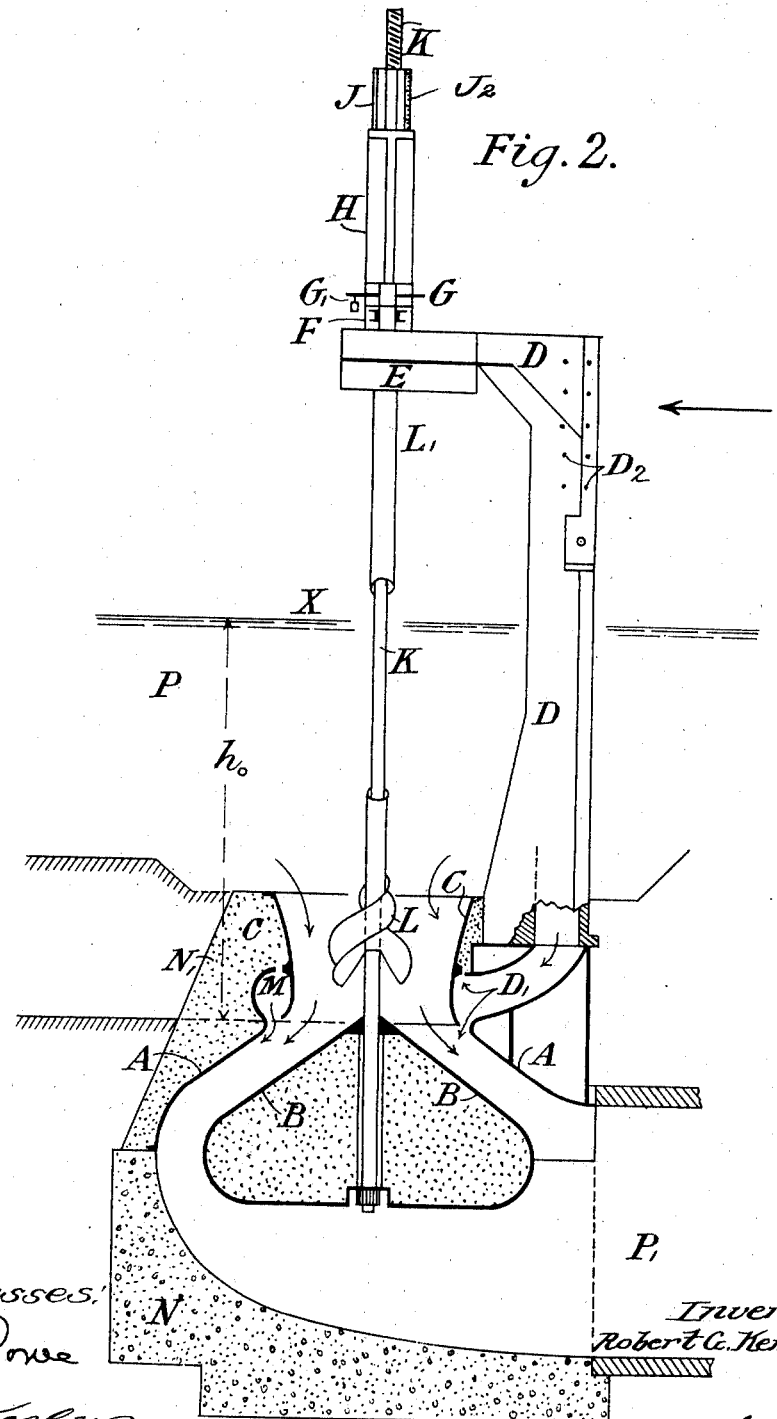

UNITED STATES PATENT OFFICE.

ROBERT G. KENNEDY, OF SIDNEY, VANCOUVER ISLAND, CANADA; THE ROYAL TRUST COMPANY EXECUTOR AND TRUSTEE OF THE WILL OF SAID ROBERT G. KENNEDY, DECEASED.

DEVICE FOR CONTROLLING A SUPPLY OF WATER FOR IRRIGATION OR OTHER PURPOSES.

1,388,723.      Specification of Letters Patent.     Patented Aug. 23, 1921.

Application filed September 19, 1918. Serial No. 254,795.

*To all whom it may concern:*

Be it known that I, ROBERT GREIG KENNEDY, a subject of the King of Great Britain, residing in Sidney, Vancouver Island, Canada, have invented a certain new and useful Device for Controlling a Supply of Water for Irrigation or other Purposes, of which the following is a specification.

This invention relates to an improved device for controlling the distribution of water with the object of insuring any fixed or required definite supply; however, the conditions usually affecting the supply may vary; the discharge actually passing being correctly indicated by inspection, and the total quantity previously delivered being also shown, while all the usual practical requirements are fulfilled.

In the accompanying drawings, Figure 1 is a general index sketch in section showing the general action of my invention in a case where a supply of water is drawn out of a channel down into an outfall pipe or flume and discharging into an outfall. Fig. 2 is an enlarged section of parts at the entrance of the flume, as indicated in Fig. 1, showing also means for regulating the entrance of supply from the channel. Fig. 3 is a sectional elevation of the parts in Fig. 2 looking in the direction of the arrow in that figure. Fig. 4 is an enlarged section of the upper part of Fig. 2, showing how regulation is effected and discharges indicated on scales and recorded. Fig. 5 is a horizontal cross section on line V—V of Fig. 4. Fig. 6 shows a horizontal cross section on line VI—VI of Fig. 4; and Fig. 7 is also a cross section on the line VII—VII of Fig. 4.

In the drawings P denotes a canal or supply channel from which water is drawn down into an outfall pipe or flume $P_1$, $P_2$, which is shown passing under an embankment $P_3$ and discharging into an outfall Q. The water level in channel P may be variable but is hereinafter taken as that indicated by X, the outfall level being presumed at Y.

The exit orifice from the canal or channel P may be from any level, but usually would be just above or just below the canal or channel bed level. It extends down through a bell mouthed opening through a cast ring C which is preferably of the form shown in Fig. 2. At the base of this opening or ring the current is deflected by an adjustable suspended coned member B and caused to flow radially between the outer surface of the cone B and the inner surface of a second hollow covering cone formed by a casting or molding A; the space or passage formed between the two members A and B providing a gradually increasing waterway or flow, which causes a decreasing velocity. The flow passage around cone B is continued underneath it, the water flowing there being confined to a suitably curved chamber or basin which is formed by means of appropriately shaped or curved concrete or other blocks N, N (Figs. 2 and 3) and which leads the flow into the outfall pipe $P_1$, $P_2$ without any undue shock or loss of head. The most contracted area of the waterway is between the lower rim of the ring C and the cone B, and this is the point to which all discharge measurements are referred, where the velocity will be highest. Below this point the velocity will gradually decrease, and the pressure head will (according to a well-known hydraulic law) consequently gradually increase till it is just enough to force its way out through the pipe $P_1$, $P_2$ into the outfall Q.

The upper part of the covering cone A is further shaped so as to form an annular open space or ring M around ring C into which air will be drawn through a hollow standard D of any suitable section, by means of the duct $D_1$ formed in the casing A, air being admitted to the interior of the standard through numerous small inlet holes $D_2$ provided in the standard above the water surface of the canal or channel P as shown in Figs. 2 and 3. The ring C is shown as a separate casting from the cone A, the two being held firmly in their correct positions *in situ* by a concrete surrounding $N_1$, Fig. 2. The bottom of the annular air space or ring M, around the ring C, is left open to the flow of water passing there, so that the pressure on the water surface at that point is just the atmospheric pressure, so long as there is a sufficient difference of level $h_1$ (Fig. 1) between the water level X in channel P and the water level Y in outfall channel Q to prevent any back pressure in the air ring M. Such required minimum head $h_1$ being provided, the discharge passing below the ring M will, under ordinary hydraulic laws, be the same as that through a similar orifice discharging into the open air, that is to say it will be proportional to the square root of the pressure head measured from the surface just below the ring M up to the water level in channel P, which head is shown as $h_0$ in Fig. 2. The discharge volume passing will also, of course, be proportional to the area of waterway below the ring which I designate as $a_0$, and also to some constant coefficient $c_0$ found by experiment as applicable to this form of orifice; so that the said discharge will be equal to $a_0 c_0 \sqrt{h_0}$, and the velocity due to the pressure head $h_0$ will be greater than that due to the working head or head arising from the difference of water level in the supply and outfall channels. But by raising or lowering the suspended cone B we can vary the area $a_0$, and since also the factor $h_1$ or difference of level, does not appear in this expression, we have by this device arrived at the means of varying the discharge without altering the level in channel P (i. e. by varying $a_0$) and also have eliminated the effect of variations in the outfall level of channel Q. Also since for any given value of $a_0$ the discharge volume simply varies as $\sqrt{h_0}$ we can graduate a scale to show discharge volume for any given value of $h_0$, which may be read off by inspection, as will be explained below.

The cover cone A is bolted down to the base blocks N and the standard D is bolted down to A at one side of the ring or orifice C, the internal cone B being suspended from a bracket E attached to the top of standard D, by a rod K which is adapted to be screwed up or down by adjustable locking nuts F and G thereon. These two nuts are similar, but are capable of being used and locked separately by means of key bars $G_1$, Figs. 4 and 7. The lower locking nut F may be regarded as mainly a means of opening or closing the whole outlet by lowering or raising the adjustable cone B. When the invention is employed in irrigation systems where the supply of water is under the control of officials the adjustment of the nut F might in many cases be left to the user or farmer to operate, while the adjustment of the nut G would usually be done by the official in charge, and readjustable by him from time to time for varying conditions of demand and supply. The upper locking nut G would be used to fix and lock at any desired maximum discharge, after the outlet has been opened by adjusting the lower nut F.

Fig. 4 shows the adjustment where the passage between the members B and C is closed, and the discharge is zero, i. e. both nuts fully screwed down with the suspending rod K and cone B in extreme closed position, thus closing the entire orifice between B and C.

Fig. 2 shows the device open and locked by the nut G to give a predetermined discharge and no more.

The suspending bar or rod K has its surface planed off for part of its length (as shown in Figs. 4, 6 and 7) to form a smooth key seat $K_1$ against which the keys of nuts G and F are driven through suitable slots in each nut, there being four such slots in each nut, so that each nut when screwed up or down on the screw threads shown on rod K can be locked at any position corresponding to heights, raised or lowered, of one fourth of a complete turn. The number of turns of the locking nuts would be an index of the amount the outlet was open and of the area of waterway $a_0$ which was open, but not a convenient index, and, moreover, as the total lift of the cone B will be comparatively small it would not be a particularly accurate index, and therefore the following arrangement is preferably adopted.

The upper locking nut G is rigidly connected or cast in one piece with a hollow cylinder H, and as shown in Fig. 5 this cylinder has two internal vertical grooves, and in these grooves the heads of the two set screws $J_1$ can slide up and down, said set screws being screwed into an inner cylinder J which is hollow for a portion of its length as shown in Figs. 2, 3 and 4. The two cylinders H and J therefore must revolve together. The suspending rod K has two separate and dissimilar screw threads cut on it. The upper part of the rod (above the coupling $K_2$ shown in Fig. 4) has a left-hand thread cut on it which screws into the upper cylinder J, and the lower part of rod K (below the said coupling) has a right-hand thread cut on it screwing into the locking nut G connected to the base of the lower cylinder H. When locking nut G is turned, the cylinder H also revolves and turns the cylinder J which at the same time slides up or down in the two grooves in H, the two cylinders telescoping into each other. Thus in Fig. 4, where the outlet is shown as closed, to open it the nut G will be unscrewed by left-handed revolutions which will cause the cylinder J to slide into cylinder H for a distance, corresponding to the sum of the "pitches" of the two screws. The action is in fact similar to that of an ordinary turn-buckle used to tighten up cables. By using suitable "pitches" for the screws, the distance the cylinder J slides into H can be made several times greater than the distance that cone B is moved up by rod K. Advantage may be taken of the increased accuracy arising from the relatively great sliding movement of cylinder J to draw on the outer surface of cylinder J vertical scales to indicate discharges, since the distance that cylinder J slides down into cylinder H when bar K is lowered will represent the area of waterway $a_0$ and all that has to be done is to calculate from the expression already given $(a_0 c_0 \sqrt{h_0})$ the discharges for any given value of $h_0$ as the cone B is lowered. The values of $h_0$ will, however, vary, so that a series of such scales will be required, one for each value of $h_0$ to be used, all such scales being plotted on a continuous diagram (on which intermediate values of $h_0$ can be interpolated) engrossed or affixed on the outer surface of cylinder J, as indicated by lines $J_2$ in Fig. 2, whereby the readings giving the discharges passing may be read on the scale appropriate for the then existing value of $h_0$ at the upper rim of cylinder H. Just what the existing value of $h_0$ is at any time will be shown on a scale or gage marked on the back of the standard D as shown at $D_3$ in Fig. 3, the reading being taken at water level X for the time being, the zero of said gage being the lower rim of ring C.

Therefore, to read the discharge passing at any time it is merely required to first read off the value of $h_0$ on the gage $D_3$, and then read the corresponding scale on cylinder J giving the discharge in cubic feet per second; and then to adjust the cone B to give any required discharge, the locking nuts G would be turned till the scale on cylinder J reads the required figure, and then the cone B would be let down by turning the locking nut F until nuts F and G are in contact.

The above are the means for giving any discharge and indicating the same with accuracy, but when a continuous record of the quantity passed is required, an attachment L, Fig. 2, similar to an ordinary velocity meter or ship's log can be fixed inside the orifice or ring C to a tube $L_1$ through which the suspending rod K loosely passes, the tube $L_1$ hanging and revolving on ball bearings R inside the removable casing E (Figs. 2 and 4), where also the recording counter S of any usual design is placed, read through an opening $D_4$ left in the bracket of D (Fig. 4) and actuated by gearing T from the revolving tube $L_1$.

The principal advantages of this device are (1) that by admitting air to a suitable part of the flume, together with the provision of an annular space between two expanding cones to again reduce the velocity, an artificially increased head of water $h_0$ is obtained much greater than ordinarily obtainable; (2) that by the provision of the increased head $h_0$ the accuracy of measurement is much increased; (3) that for the same reason of increased "head," the steadiness of flow in the outlet, under fluctuations in the supply channel, is much improved over that usually obtained; (4) that the discharge passing out in the outfall is also rendered quite independent of the level in the outfall, and thus beyond the interference of interested parties; (5) that by thus eliminating the effect of the level in the outfall, it becomes possible (otherwise impossible) to show on a graduated scale the discharges actually passing; (6) that any desired discharge can be given and indicated, without altering the level of water in the supply channel; (7) that if required a continuous record of the total quantity supplied up to any period, can be read off by a counter of ordinary design.

It is to be understood that the expression "flume" as used hereinafter in the claims is intended to apply to any form of conduit, passage, pipe, or equivalent adapted to connect the supply and outfall channels, and having the effect and for the purpose set forth in this specification.

Having thus described the nature of the said invention and the best means I know of carrying the same into practical effect, I claim:—

1. In devices for controlling water supply, the combination of a flume having contracted and expanded parts connecting a supply channel, with an outfall channel, means for subjecting water at the contracted part to atmospheric pressure for artificially increasing the velocity head of the water whereby the discharge passing the contracted part is independent of the outfall level, and means for varying the area of the contracted part for varying the discharge passing therethrough.

2. In devices for controlling water supply, the combination of a flume having contracted and expanded parts, connecting a supply channel with an outfall channel, a passage for subjecting the water passing through the contracted part to atmospheric pressure for artificially increasing the velocity head, means for recovering the greater part of the pressure head thus temporarily lost by the said increased velocity head whereby the discharge is independent of the outfall level, and means for indicating the discharge passing through said contracted part.

3. In devices for controlling water supply, the combination of a flume having contracted and expanded parts, connecting a supply channel with an outfall channel, a passage open to the atmosphere and in communication with the contracted part of the flume, and means for altering the area of flow of the contracted part whereby the discharge is varied in proportion to such change of area provided the supply level is constant.

4. In devices for controlling water supply, the combination of a flume having contracted and expanded parts connecting a supply channel with an outfall channel, a passage open to the atmosphere and in communication with the contracted part of the flume, means for altering the area of flow in the contracted part whereby the discharge is varied in proportion to such change of area provided the supply level is constant, and mechanism automatically controlled by the operation of said means for indicating the discharge passing through said contracted part of the flume.

5. In devices for controlling water supply, the combination of a flume having contracted and expanded parts, connecting a supply channel with an outfall channel, a passage open to the atmosphere and in communication with the contracted part of the flume, means for altering the area of flow of the contracted part of the flume whereby the discharge is varied in proportion to such change of area provided the supply level is constant, and mechanism automatically controlled by the operation of said means for indicating in greater magnitude the extent of the change in area and graduations co-operating with said indicating means for giving the discharge passing through the flume for various values of the supply level.

6. A device for controlling the supply of water from a supply channel to an outfall channel, comprising a flume having a bell mouth inlet ring communicating at its upper end with the supply channel and at its lower end with a downwardly and radially flowing hollow cone-like chamber leading to the outfall channel, a conical member suspended within and coaxially with the said chamber and having a downwardly flaring wall arranged to form with the wall of the chamber a passage of gradually increasing cross sectional area for the flow of the water, an annular air supply channel encircling the lower end of the inlet ring, the lower end of the air channel being open to the water flowing from the ring, and means for raising and lowering the conical member in axial directions with respect to the hollow coned chamber to vary the waterway area of the passage.

7. A device for controlling the supply of water from a supply channel to an outfall channel, comprising a flume having a bell mouth inlet ring communicating at its upper end with the supply channel and at its lower end with a downwardly and radially flowing hollow cone-like chamber leading to the outfall channel, a conical member suspended within and coaxially with the said chamber and having a downwardly flaring wall arranged to form with the wall of the chamber a passage of gradually increasing cross sectional area for the flow of the water, an annular air supply channel encircling the lower end of the inlet ring, the lower end of the air channel being open to the water flowing from the ring, means for raising and lowering the conical member in axial directions with respect to the hollow coned chamber to vary the waterway area of the passage, means controlled by the first said means for indicating on magnified scale the extent of the rising and falling movements of the conical member and means controlled by said movements for automatically indicating the supply passing at any time.

8. A device for controlling the supply of water from a supply channel to an outfall channel, comprising a flume having a bell mouth inlet ring communicating at its upper end with the supply channel and at its lower end with a downwardly flowing hollow cone-like chamber leading to the outfall channel, a conical member suspended within and coaxially with the said chamber and having a downwardly flaring wall arranged to form with the wall of the chamber a passage of gradually increasing cross sectional area for the flow of the water, an annular air supply channel encircling the lower end of the inlet ring, the lower end of the air channel being open to the water flowing from the ring, means for raising and lowering the conical member in axial directions with respect to the hollow coned chamber to vary the waterway area of the passage, means controlled by the first said means for indicating on magnified scale the extent of the rising and falling movements of the conical member and means controlled by said movements for automatically indicating the supply passing at any time, and means for recording the total supply discharged during any given period.

In testimony whereof I have signed my name to this specification.

ROBERT G. KENNEDY.